(12) United States Patent
Morris (10) Patent No.: US 8,036,332 B2
(45) Date of Patent: Oct. 11, 2011

(54) COMMUNICATION SIGNAL SYMBOL TIMING ERROR DETECTION AND RECOVERY

(75) Inventor: Keith Morris, Arnprior (CA)

(73) Assignee: 4472314 Canada Inc., Ottawa, Ontario (CA)

( * ) Notice: Subject to any disclaimer, the term of this patent is extended or adjusted under 35 U.S.C. 154(b) by 737 days.

(21) Appl. No.: 12/055,862

(22) Filed: Mar. 26, 2008

(65) Prior Publication Data
US 2008/0240221 A1    Oct. 2, 2008

Related U.S. Application Data (60) Provisional application No. 60/909,064, filed on Mar. 30, 2007.

(51) Int. Cl.
*H04L 7/00* (2006.01)
(52) U.S. Cl. ........ 375/371; 375/354; 375/316; 375/343; 375/346; 375/229; 375/232
(58) Field of Classification Search .................. 375/371, 375/354, 316, 343, 346, 229, 232
See application file for complete search history.

(56) References Cited

U.S. PATENT DOCUMENTS

| | | | |
|---|---|---|---|
| 5,315,619 A | | 5/1994 | Bhatt |
| 5,353,312 A | | 10/1994 | Cupo et al. |
| 5,386,239 A | * | 1/1995 | Wang et al. ................... 348/472 |
| 5,454,015 A | | 9/1995 | Olafsson |
| 5,550,596 A | | 8/1996 | Strolle et al. |
| 5,588,025 A | * | 12/1996 | Strolle et al. ................... 375/316 |
| 5,612,975 A | * | 3/1997 | Becker et al. .................. 375/319 |
| 5,666,170 A | | 9/1997 | Stewart |
| 5,764,102 A | | 6/1998 | Cochran et al. |
| 5,793,821 A | * | 8/1998 | Norrell et al. .................. 375/355 |
| 5,799,037 A | * | 8/1998 | Strolle et al. .................. 375/233 |
| 6,177,835 B1 | | 1/2001 | Grebowsky et al. |
| 6,275,548 B1 | * | 8/2001 | Wolf et al. ..................... 375/355 |

(Continued)

FOREIGN PATENT DOCUMENTS
WO    WO 95/26074    9/1995

(Continued)

OTHER PUBLICATIONS

Fred Harris: "Band Edge Filtering and Processing for Timing and Carrier Recovery"; 7th International Conference on Advances in Communication and Control: Telecommunications/Signal Processing, Athens, Greece; Jun. 28-Jul. 2, 1999. (9 pages).

(Continued)

*Primary Examiner* — Kenneth Lam (57) ABSTRACT

Communication signal symbol timing error detection and recovery apparatus and techniques are disclosed. A communication signal that includes symbols is sampled according to receive symbol timing. The samples are band-edge filtered to provide a filtered output signal including band edges of the samples. The filtered output signal is converted to baseband, and a phase error of the receive symbol timing is calculated based on the down converted baseband signal. The communication signal may include symbols associated with quadrature channels, in which case a respective filtered output signal that includes band edges of samples associated with each quadrature channel may be down converted. The down converted baseband signals may then be separated into upper and lower band-edge signals, which are used to calculate a phase error of the receive symbol timing. The upper and lower band-edge signals may also be used for other purposes, such as slope equalization and/or carrier synchronization.

20 Claims, 10 Drawing Sheets

U.S. PATENT DOCUMENTS

| | | | |
|---|---|---|---|
| 6,295,325 B1 * | 9/2001 | Farrow et al. | 375/327 |
| 6,430,234 B1 * | 8/2002 | Perlow | 375/321 |
| 6,545,532 B1 | 4/2003 | Maalej et al. | |
| 6,697,439 B1 * | 2/2004 | Trivedi et al. | 375/326 |
| 7,072,425 B2 * | 7/2006 | Jun et al. | 375/326 |
| 2005/0286661 A1 | 12/2005 | Kwak | |
| 2008/0049871 A1 * | 2/2008 | Yang et al. | 375/316 |

FOREIGN PATENT DOCUMENTS

| | | |
|---|---|---|
| WO | WO 98/14005 | 4/1998 |
| WO | WO 99/48219 | 9/1999 |
| WO | WO 99/60746 | 11/1999 |
| WO | WO 02/063842 A2 | 8/2002 |

OTHER PUBLICATIONS

Floyd M. Gardner: "Interpolation in Digital Modems—Part I: Fundamentals" in IEEE Transactions on Communications, vol. 41, No. 3, Mar. 1993; pp. 501-507.

L. E. Franks: "Carrier and Bit Synchronization in Data Communication—A Tutorial Review" in IEEE Transactions on Communications, vol. Com-28, No. 8, Aug. 1980; pp. 1107-1121.

William Webb and Lajos Hanzo: Modern Quadrature Amplitude Modulation, IEEE Press, New York 1998; pp. 170-175.

John G. Proakis: Digital Communications, Third Edition, McGraw-Hill, Inc., Toronto 1995; pp. 347-350.

Extended European Search Report including European Search Opinion for Application No. EP 08 15 3503; (7 pages).

* cited by examiner

FIG. 1 a) Symbol sequence b) Periodic frequency response c) Frequency response after interpolation and filtering

FIG. 2

FIG. 3 a) Received signal spectrum at 2 samples per symbol b) Band-edge filter function c) Band-edge signal

Derivative of baseband waveform with
Receive sample clock in phase

COMMUNICATION SIGNAL SYMBOL TIMING ERROR DETECTION AND RECOVERY

CROSS-REFERENCE TO RELATED APPLICATION

The present application is related to, and claims the benefit of, U.S. Provisional Patent Application Ser. No. 60/909,064, entitled "COMMUNICATION SIGNAL SYMBOL TIMING ERROR DETECTION AND RECOVERY", and filed on Mar. 30, 2007, the entire contents of which are incorporated herein by reference.

FIELD OF THE INVENTION

This invention relates generally to communications and, in particular, to detecting timing errors and recovering symbol timing for symbols received in communication signals.

BACKGROUND

Some conventional schemes for communication signal symbol timing recovery require 4 samples per symbol to implement. This in turn limits the data rates that can be processed at a communication signal receiver. Digital implementations of such schemes can be particularly problematic for high data rates, since high-speed digital components would be required to support the sampling rate.

Thus, there remains a need for improved symbol timing recovery techniques.

SUMMARY

Embodiments of the invention may provide a method and digital means of detecting symbol timing phase-error of a complex-modulation signal, which involves a lower oversampling rate at baseband than conventional techniques. The lower oversampling rate may enable an efficient digital implementation, as part of an all-digital modem demodulator for instance, without imposing very high speed requirements on the digital components.

According to one aspect of the invention, an apparatus includes a band-edge filtering arrangement, a down converter, and a symbol timing phase error calculator. The band-edge filtering arrangement is operable to receive as inputs samples of a received communication signal, and to provide a filtered output signal comprising band edges of the samples. The received communication signal includes symbols and the samples are samples of the communication signal according to receive symbol timing. The down converter is operatively coupled to the band-edge filtering arrangement and is operable to convert the filtered output signal to baseband. The symbol timing phase error calculator is operatively coupled to the down converter and is operable to calculate a phase error of the receive symbol timing based on the down converted baseband signal.

In some embodiments, the symbols have a symbol rate $f_s$, and the receive symbol timing comprises a receive sample clock having a frequency of $2f_s$.

In some embodiments, the down converter is operable to down convert the filtered output signal to baseband by multiplying the filtered output signal by quadrature carrier waveforms.

In some embodiments, the symbols have a symbol rate $f_s$, the receive symbol timing comprises a receive sample clock having a frequency of $2f_s$, and the quadrature carrier waveforms have a frequency of $f_s/2$.

In some embodiments, a Local Oscillator (LO) is operatively coupled to the down converter for generating the quadrature carrier waveforms.

In some embodiments, the quadrature carrier waveforms comprise four-cycle quadrature patterns.

In some embodiments, the down converter comprises a filter for filtering out non-baseband mixing products of the filtered output signal and the quadrature carrier signals.

In some embodiments, the symbol timing phase error calculator comprises a sign function for determining a sign of a product of the filtered output signal and one of the quadrature carrier waveforms, and a multiplier for multiplying the product of the filtered output signal and another of the quadrature carrier waveforms by the determined sign.

In some embodiments, the band-edge filtering arrangement comprises a low pass communication channel filter and a high pass filter operatively coupled to the low pass channel filter.

In some embodiments, the apparatus also includes a sample interpolator operatively coupled to the band-edge filtering arrangement and operable to provide the samples to the band-edge filtering arrangement.

In some embodiments, the apparatus also includes a feedback path operatively coupled between the symbol timing phase error calculator and the sample interpolator. The feedback path includes a controller for adjusting the receive symbol timing based on the calculated symbol timing phase error.

In some embodiments, the apparatus also includes an Analog to Digital Converter (ADC) operatively coupled to the band-edge filtering arrangement and operable to provide the samples to the band-edge filtering arrangement, a Voltage Controlled Oscillator (VCO) operatively coupled to the ADC and operable to generate the receive symbol timing, and a feedback path operatively coupled between the symbol timing phase error calculator and the VCO, the feedback path comprising a controller for controlling the VCO to adjust the receive symbol timing based on the calculated symbol timing phase error.

In some embodiments, the symbols comprise Quadrature Amplitude Modulation (QAM) symbols.

In some embodiments, the apparatus includes a respective band-edge filtering arrangement, down converter, and symbol timing phase error calculator for In-phase (I) and Quadrature (Q) QAM channels, and also includes a combiner operatively coupled to the I and Q channel symbol timing phase error calculators and operable to combine the phase errors calculated by the symbol timing phase error calculators into an overall symbol timing phase error.

In some embodiments, the band-edge filtering arrangement, the down converter, and the symbol timing phase error calculator are provided for only one of I and Q QAM channels.

According to another aspect of the invention, a method includes band-edge filtering samples of a received communication signal to provide a filtered output signal comprising band edges of the samples, the received communication signal comprising symbols and the samples comprising samples of the communication signal according to receive symbol timing, down converting the filtered output signal to baseband, and calculating a phase error of the receive symbol timing based on the down converted baseband signal.

In some embodiments, the symbols have a symbol rate $f_s$, and the receive symbol timing comprises a receive sample clock having a frequency of $2f_s$.

In some embodiments, down converting involves multiplying the filtered output signal by quadrature carrier waveforms.

In some embodiments, the symbols have a symbol rate $f_s$, the receive symbol timing comprises a receive sample clock having a frequency of $2f_s$, and the quadrature carrier waveforms have a frequency of $f_s/2$.

In some embodiments, the quadrature carrier waveforms comprise four-cycle quadrature patterns.

In some embodiments, the method also involves filtering out non-baseband mixing products of the filtered output signal and the quadrature carrier signals.

In some embodiments, calculating involves determining a sign of a product of the filtered output signal and one of the quadrature carrier waveforms, and multiplying the product of the filtered output signal and another of the quadrature carrier waveforms by the determined sign.

In some embodiments, band-edge filtering involves performing a low pass filtering operation and a high pass filtering operation.

In some embodiments, the method also involves interpolating samples of the received communication signal to provide the samples for band-edge filtering.

In some embodiments, the method also involves adjusting the receive symbol timing based on the calculated symbol timing phase error.

In some embodiments, the symbols comprise QAM symbols.

In some embodiments, the band-edge filtering, the down converting, and the calculating are performed for I and Q QAM channels, and the method also involves combining the phase errors calculated for the I and Q channels into an overall symbol timing phase error.

In some embodiments, the band-edge filtering, the down converting, and the calculating are performed for only one of I and Q QAM channels.

Such a method may be implemented, for example, in instructions stored on a computer-readable medium.

A communication signal receiver is also provided, and includes means for band-edge filtering samples of a received communication signal to provide a filtered output signal comprising band edges of the samples, the received communication signal comprising symbols and the samples comprising samples of the communication signal according to receive symbol timing, means for down converting the filtered output signal to baseband, and means for calculating a phase error of the receive symbol timing based on the down converted baseband signal.

An apparatus according to another aspect of the invention includes a band-edge filtering arrangement that is operable to receive as inputs samples of a received communication signal. The received communication signal includes symbols associated with quadrature channels and the samples are samples of the communication signal according to receive symbol timing. The band-edge filtering arrangement is further operable to provide a respective filtered output signal that includes band edges of samples associated with each quadrature channel. A down converter is operatively coupled to the band-edge filtering arrangement and is operable to convert the filtered output signals to baseband. A band-edge signal separator is operatively coupled to the down converter and is operable to separate the down converted baseband signals into upper and lower band-edge signals. A symbol timing phase error calculator is operatively coupled to the band-edge signal separator and is operable to calculate a phase error of the receive symbol timing based on the upper and lower band-edge signals.

In some embodiments, the symbols have a symbol rate $f_s$, and the receive symbol timing comprises a receive sample clock having a frequency of $2f_s$.

In some embodiments, the down converter is operable to down convert the filtered output signals to baseband by multiplying each of the filtered output signals by quadrature carrier waveforms.

In some embodiments, the symbols have a symbol rate $f_s$, the receive symbol timing comprises a receive sample clock having a frequency of $2f_s$, and the quadrature carrier waveforms have a frequency of $f_s/2$.

In some embodiments, the apparatus also includes an LO operatively coupled to the down converter for generating the quadrature carrier waveforms.

In some embodiments, the band-edge signal separator comprises combiners operatively coupled to the down converter and operable to combine the down converted baseband signals into the upper and lower band-edge signals, and filters operatively coupled to the combiners and operable to filter non-baseband components out of the upper and lower band-edge signals.

In some embodiments, the apparatus also includes power calculators for calculating powers of the upper and lower band-edge signals, and a combiner for calculating a difference between the powers of the upper and lower band-edge signals.

In some embodiments, the apparatus also includes a slope equalizer operatively coupled to the band-edge filtering arrangement, and a feedback path operatively coupled between the band-edge signal separator and the slope equalizer, the feedback path comprising a controller for controlling the slope equalizer based on the upper and lower band-edge signals.

In some embodiments, the apparatus also includes a phase error feedback path operatively coupled to the symbol timing phase error calculator, the phase error feedback path comprising a controller for adjusting a phase of the receive symbol timing based on the calculated symbol timing phase error.

In some embodiments, the symbols comprise QAM symbols.

A related method is also provided, and includes band-edge filtering samples of a received communication signal, the received communication signal comprising symbols associated with quadrature channels and the samples comprising samples of the communication signal according to receive symbol timing, to provide a respective filtered output signal comprising band edges of samples associated with each quadrature channel, down converting the filtered output signals to baseband, separating the down converted baseband signals into upper and lower band-edge signals, and calculating a phase error of the receive symbol timing based on the upper and lower band-edge signals.

In some embodiments, the symbols have a symbol rate $f_s$, and the receive symbol timing comprises a receive sample clock having a frequency of $2f_s$.

In some embodiments, down converting involves multiplying each of the filtered output signals by quadrature carrier waveforms.

In some embodiments, the symbols have a symbol rate $f_s$, the receive symbol timing comprises a receive sample clock having a frequency of $2f_s$, and the quadrature carrier waveforms have a frequency of $f_s/2$.

In some embodiments, separating involves combining the down converted baseband signals into the upper and lower band-edge signals, and filtering non-baseband components out of the upper and lower band-edge signals.

In some embodiments, the method also involves calculating power of the upper and lower band-edge signals, and calculating a difference between the powers of the upper and lower band-edge signals.

In some embodiments, the method also involves adjusting a phase of the receive symbol timing based on the calculated symbol timing phase error.

In some embodiments, the symbols comprise QAM symbols.

In some embodiments, the method is embodied in instructions stored on a computer-readable medium.

Another aspect of the invention provides an apparatus that includes means for band-edge filtering samples of a received communication signal, the received communication signal comprising symbols associated with quadrature channels and the samples comprising samples of the communication signal according to receive symbol timing, to provide a respective filtered output signal comprising band edges of samples associated with each quadrature channel, means for down converting the filtered output signals to baseband, means for separating the down converted baseband signals into upper and lower band-edge signals, and means for calculating a phase error of the receive symbol timing based on the upper and lower band-edge signals.

Other aspects and features of embodiments of the present invention will become apparent to those ordinarily skilled in the art upon review of the following description.

BRIEF DESCRIPTION OF THE DRAWINGS

Examples of embodiments of the invention will now be described in greater detail with reference to the accompanying drawings, in which.

DETAILED DESCRIPTION OF PREFERRED EMBODIMENTS

According to embodiments of the present invention, a symbol timing error detector can be implemented at least in part in compact digital hardware, illustratively in a Field Programmable Gate Array (FPGA) or an Application Specific Integrated Circuit (ASIC), at baseband using complex-valued, asynchronously-sampled discrete-time signals. The asynchronous baseband sampling rate corresponds to reduced oversampling for a given maximum symbol rate, relative to existing techniques, and is fixed in some embodiments.

Symbol timing for QAM signals, for example, can be recovered from a band-edge filtered baseband signal. This technique exploits the cyclostationarity of a QAM received signal. However, instead of first nonlinearly processing a received QAM signal to extract the cyclic-frequency spectral lines from the resulting spectrum, in this case the baud or symbol rate, complex-valued band-edge filtered signal sidebands are first downconverted to approximately 0 Hz center frequency (i.e., baseband) using a halved, partially-recovered symbol clock, which becomes the recovered symbol clock when symbol timing recovery has converged. Subsequent nonlinear processing of these sidebands can be performed at a much slower rate since they are narrowband. In conventional systems, nonlinearly-processed signals must subsequently be processed at a sample rate of at least 4 samples per symbol, owing to the spectral broadening caused by the nonlinearity and the requirement to preserve information in the broadened spectrum (i.e., the symbol-rate lines) according to the well-known Nyquist sampling theory.

In one embodiment of the present invention, the maximum sampling rate is 2 times the maximum symbol rate, or 2 samples per symbol. This can provide a significant advantage in terms of the range of data rates that can be processed and the speed requirements of components for digital implementations, for instance.

These and other aspects of the invention are described in further detail below, primarily in the context of an illustrative example of QAM signals.

Figure 1:
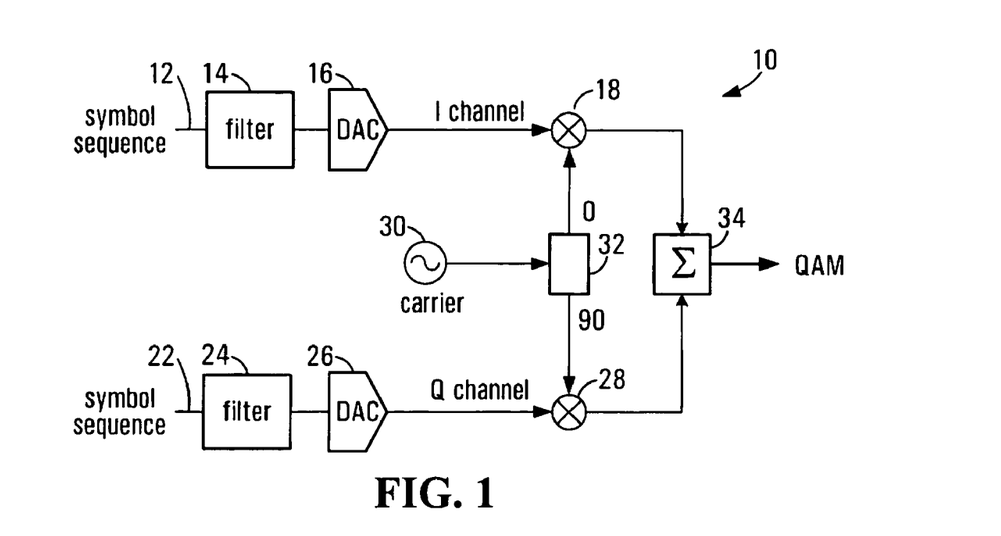
FIG. 1 is a block diagram of an example Quadrature Amplitude Modulation (QAM) modulator.

A QAM signal is comprised of two independent sequences of symbols, drawn from a finite set of values at a constant symbol rate $f_s$, that are filtered, modulated on quadrature carriers, and combined. FIG. 1 is a block diagram of an example QAM modulator. In the modulator 10, filters 14, 24 filter digital symbol sequences at 12, 22 for In-phase (I) and Quadrature (Q) channels. The samples of each sequence at 12, 22 may be converted to a higher sample rate prior to filtering. The filtered symbols are converted to analog voltages by Digital-to-Analog Converters (DACs) 16, 26 and may also be ultimately filtered by analog filters (not shown) before being presented to a quadrature modulator. In the example shown in FIG. 1, the quadrature modulator includes mixers 18, 28, an oscillator 30, a phase shifter 32, and a combiner 34. The mixers 18, 28 modulate the analog converted symbols on quadrature carriers that are generated by the oscillator 30 and the phase shifter 32. The modulated symbols are combined by the combiner 34 to generate a QAM symbol.

Figure 2:
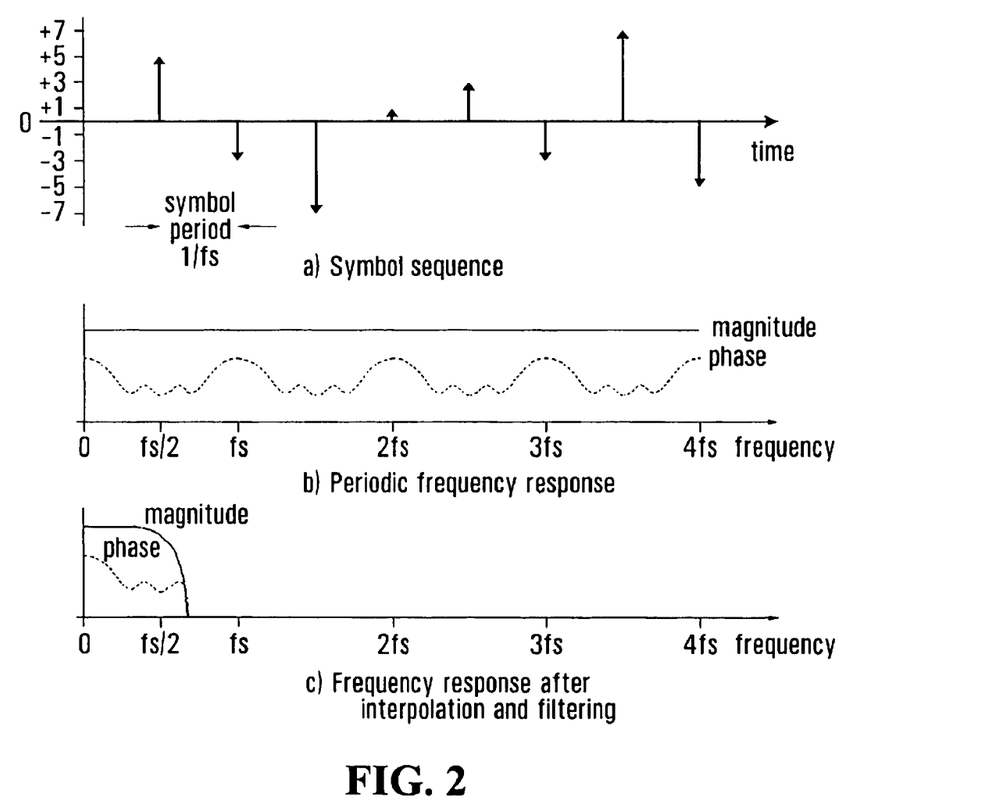
FIG. 2 shows example symbol and frequency response plots.

Those skilled in the art will be familiar with QAM modulators such as 10 and their operation. FIG. 2 shows example symbol and frequency response plots, and will be referenced to further illustrate the process of generating QAM signals. To generate 64 QAM, for example, the symbol sequences at 12, 22 are drawn from an eight value set (−7 −5 −3 −1 +1 +3 +5 +7). A symbol sequence at 12, 22 can be illustrated, as shown in FIG. 2a), as a sequence of Dirac pulses at rate $f_s$. The discrete time domain nature of the signal means the frequency response is a periodic function of frequency with period $f_s$, as shown in FIG. 2b). The magnitude of the frequency response is shown in FIG. 2b) with its long-term expected flat response to better illustrate frequency shaping steps that follow.

FIG. 2b) also shows that the frequency response is symmetric about $f_s/2$. This is because the sequence is a real signal.

FIG. 2c) shows the frequency response of a signal before the modulator. Due to the symmetry about $f_s/2$ as noted above, the portion of the response to the left of $f_s/2$ carries all of the information in the original symbol sequence, whereas the portion of the response to the right of $f_s/2$ represents excess bandwidth.

Figure 3:
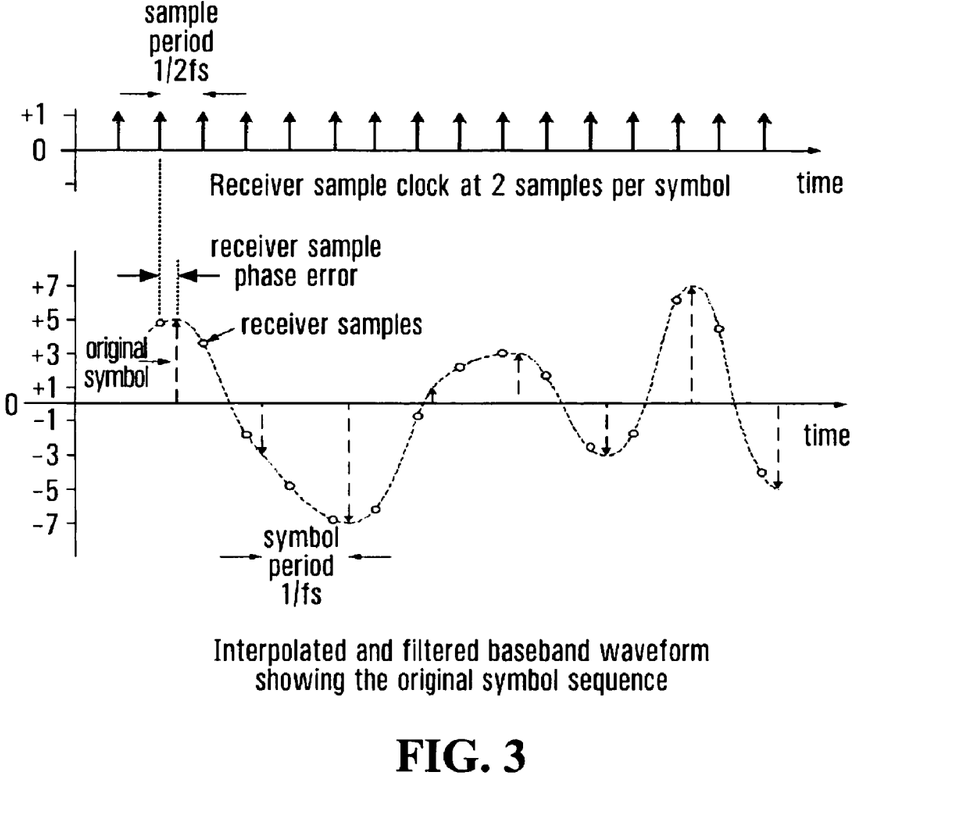
FIG. 3 shows example plots of a receiver sample clock and a received waveform.

At a receiver, the QAM signal is down converted and the I and Q signals are digitized with Analog to Digital Converters (ADCs), which sample the I and Q baseband signals. These ADCs, themselves or in combination with interpolators in some embodiments as described below, provide an effective sampling rate of two samples per symbol ($2f_s$). Where the receiver sampling clock is not synchronized with the original symbol rate $f_s$, the samples will be out of phase with the original symbol sequence. For a sample phase error of zero, the received waveform is sampled at the optimum time to recover the transmitted symbol sequence. This is illustrated in FIG. 3, which shows example plots of a receiver sample clock and a received waveform.

Figure 4:
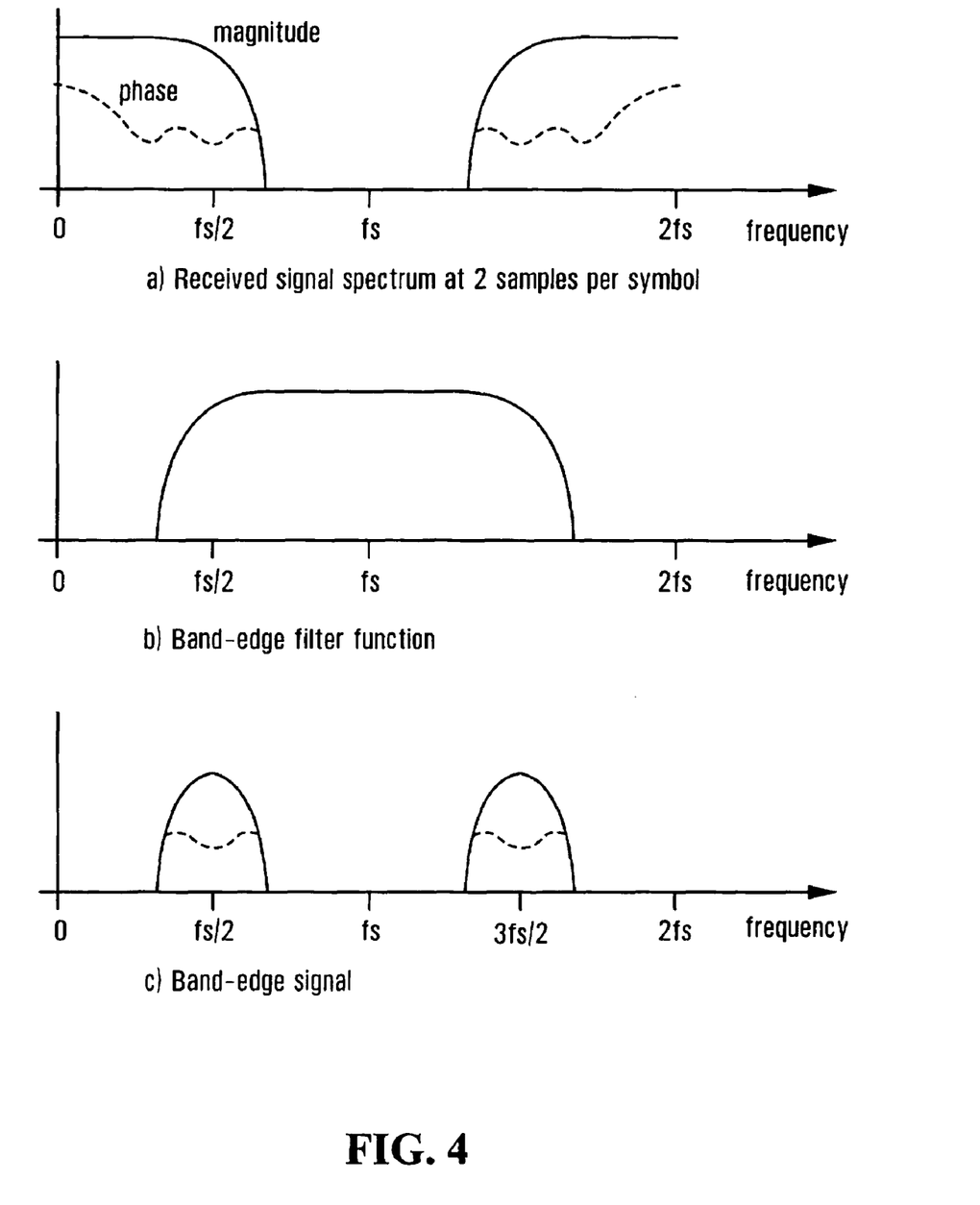
FIG. 4 shows example plots of a received signal, a band-edge filter function, and a band-edge signal.

FIG. 4 shows example plots of a received signal, a band-edge filter function, and a band-edge signal. The frequency response of the sampled I or Q signal is a periodic function with period $2f_s$, and is symmetric about $f_s$, as shown in FIG. 4a). If the signal is filtered with a high pass function having an attenuation characteristic that is complementary to the base-band signal frequency response, and ideally the reverse of the QAM frequency response, the result is a narrow band pass signal with a frequency response symmetric about $f_s/2$. In order to save hardware resources, a less than ideal high pass filter could be implemented, with the penalty being noise in the filtered signal, which might be used in phase detection, for instance. The effects of the resultant noise can be reduced, for example, through averaging in a loop filter, although this would provide a slower loop response. Embodiments of the invention in which loop filters are provided are described below with reference to FIGS. 8 and 11.

Using a band-edge filter having a characteristic as shown in FIG. 4b) results in two narrow band pass signals at $f_s/2$ and $3f_s/2$, as shown in FIG. 4c).

What has been done effectively to this point on the I and Q signals is to select the signal energy around $f_s/2$ from the original periodic frequency response shown in FIG. 2b). This band-edge signal has a frequency response including a band edge that is symmetric, or at least nearly symmetric depending on the high pass filter characteristic, about $f_s/2$, which is ¼ the sample clock frequency of $2f_s$. The frequency response of the sampled signals in FIG. 4a) is periodic with period $2f_s$, and symmetric about the half clock rate ($f_s$). Thus, the band-edge signal in FIG. 4c) appears with a symmetric response about $f_s/2$, and an image response at $3f_s/2$.

Figure 5:
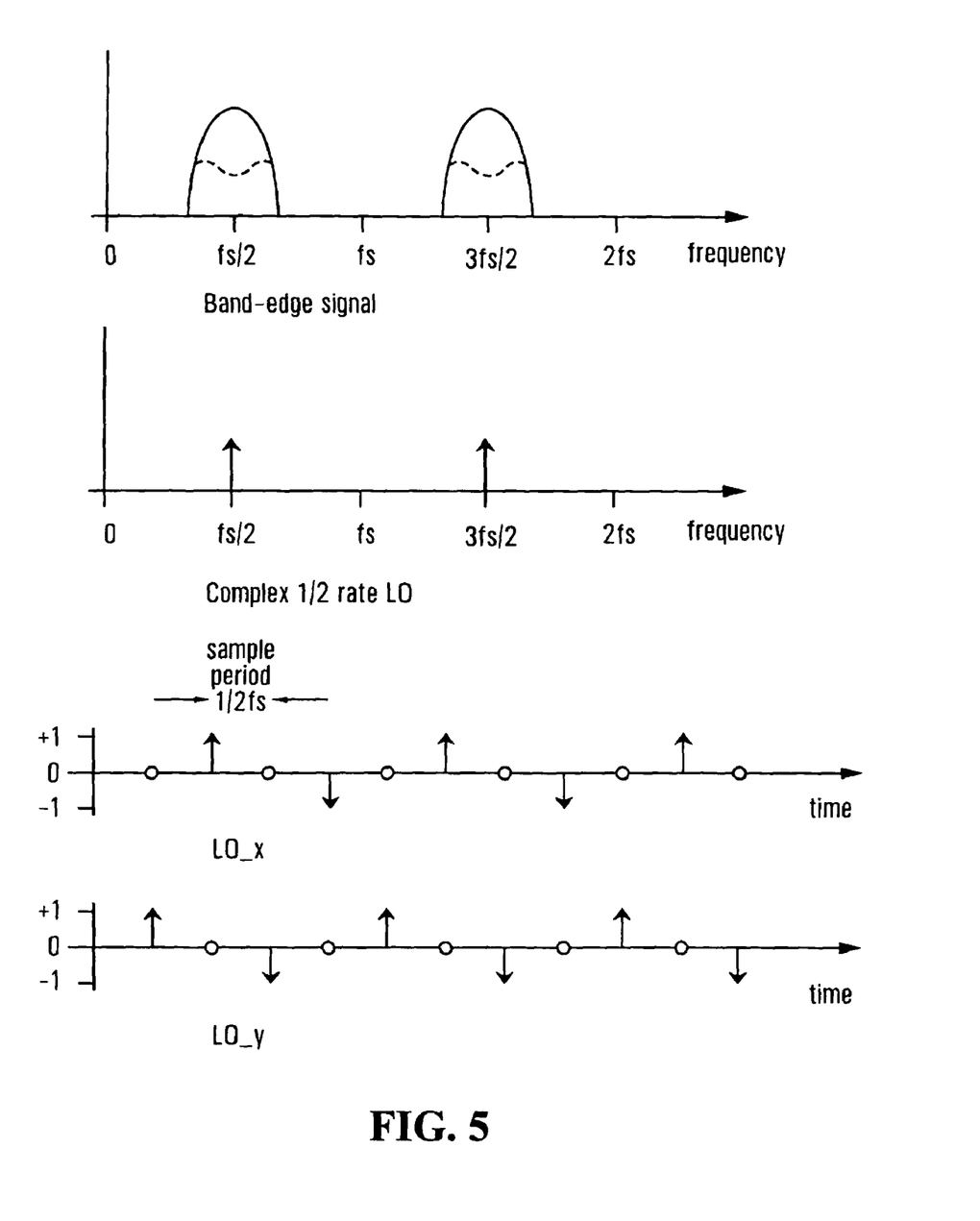
FIG. 5 shows example plots of a band-edge signal, a complex half-rate Local Oscillator (LO) signal, and time domain representations of quadrature LO signals.

Various methods for receiver synchronization can be considered. One method of recovering $f_s$ may use techniques that exploit the carrier-like waveform of the band-edge signal. Squaring the band-edge signal, for example, creates a spectral line at twice the carrier frequency ($f_s$). This "carrier" waveform can then be extracted by filtering or Phase Locked Loop (PLL) techniques. A decision directed loop or Costas loop can also be used, in which case the band-edge signal is multiplied by quadrature carrier waveforms with frequency $f_s/2$. These carrier waveforms, which could be generated by a complex LO, convert the band-edge signals to baseband. This technique is illustrated in the plots of FIG. 5. As shown, on the $2f_s$ receive sample clock, the two carrier waveforms appear as four-cycle quadrature patterns: LO_x is 0 +1 0 −1 and LO_y is +1 0 −1 0.

Figure 6A:
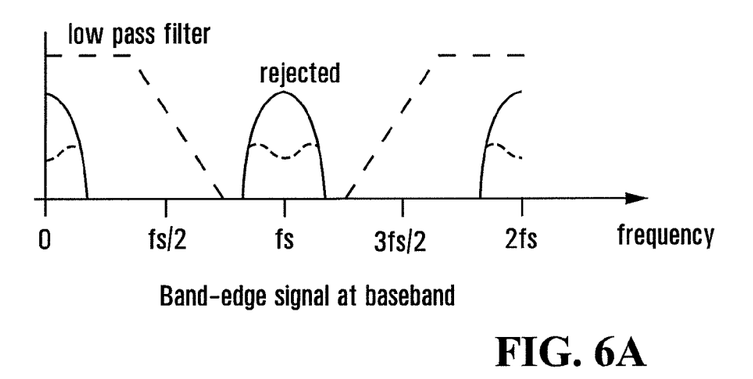
FIG. 6A shows an example band-edge signal at baseband and FIG. 6B shows an example x versus y plot of the baseband signal.

After the complex down conversion, the band-edge signal appears as two baseband signals (x and y) that can be filtered to reject mixing products around $f_s$, as shown in FIG. 6A. Viewed in x versus y format shown in FIG. 6B, the baseband signals appear as a varying magnitude vector. The angle this vector makes with the x axis is the receiver sample clock phase error.

It should be noted here that the complex LO signals need not necessarily be independently generated signals. In one embodiment, LO_x is a four clock cycle pattern counted out by the sample clock and has a frequency response shown in FIG. 5, specifically discrete lines at $f_s/2$ and $3f_s/2$. This pattern, together with a 90 degree shifted version of it, i.e., LO_y: (+1 0 −1 0), are multiplied with the band-edge signal samples to create a complex baseband representation of the band-edge signal as shown in FIG. 6A.

Figure 7:
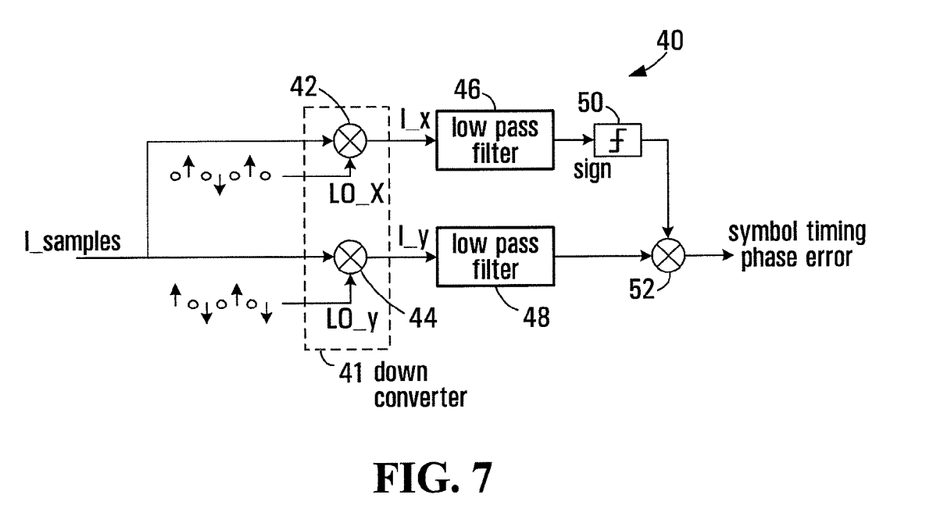
FIG. 7 is a block diagram of a symbol timing phase error detector.

The phase error quantity can be obtained by multiplying y by the sign of x (+1 or −1). FIG. 7 is a block diagram of a symbol timing phase error detector that may be used to implement these functions. The detector 40 includes a down converter 41, in the form of the mixers 42, 44, for converting band-edge filtered samples to baseband, low pass filters 46, 48 for filtering non-baseband mixing products, a sign function 50, and a multiplier 52. Although not specifically shown in FIG. 7, one or more LOs may also be provided for generating the quadrature carrier waveforms, illustratively from the sample clock or independently. A quadrature carrier LO may be dedicated to symbol timing recovery or shared between the symbol timing phase error detector 40 and other components of a communication signal receiver such as a modem.

Figure 8:
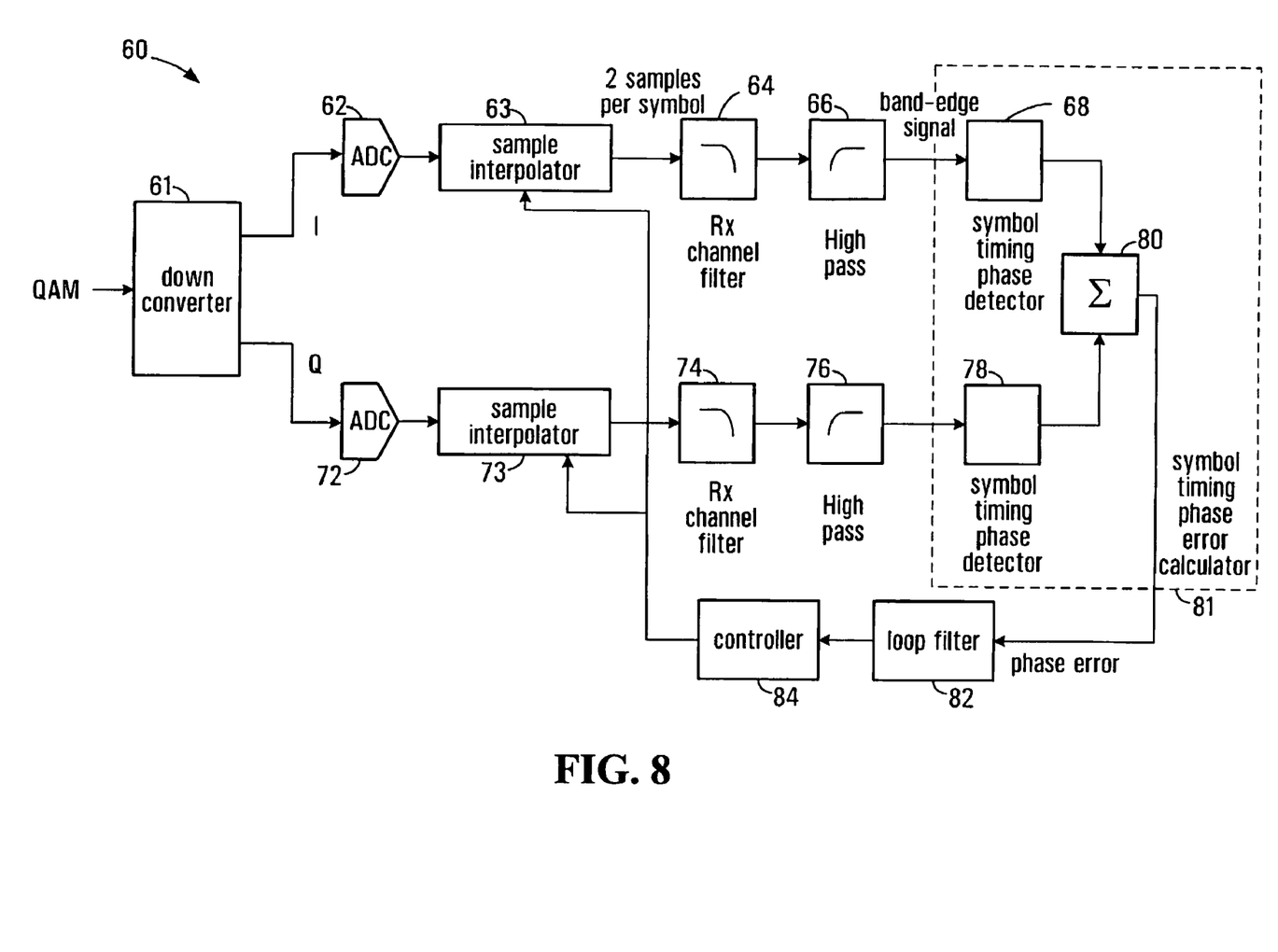
FIG. 8 is a block diagram of an example QAM symbol timing recovery system.

FIG. 8 is a block diagram of an example QAM symbol timing recovery system. The system 60 includes a down converter 61, ADCs 62, 72 operatively coupled to the down converter, sample interpolators 63, 73 operatively coupled to the ADCs 62, 72, receive channel filters 64, 74, illustratively low pass filters, operatively coupled to the sample interpolators, high pass filters 66, 76 operatively coupled to the channel filters, and symbol timing phase detectors 68, 78 operatively coupled to the high pass filters. It should be apparent that each of the symbol phase timing error detectors 68, 78 may have a structure as shown in FIG. 7. A combiner 80 is operatively coupled to the symbol timing phase detectors 68, 78 and provides an overall phase error to a feedback path that includes a loop filter 82 and a controller 84. The symbol timing error detectors 68, 78 and the combiner 80 represent one example of a symbol timing phase error calculator 81 for calculating a phase error. The controller 84 is operatively coupled to the sample interpolators 63, 73, and adjusts sample timing based on calculated symbol timing phase error.

The phase of the receiver samples can thus be adjusted with the interpolators 63, 73 on the I and Q channels after the ADCs 62, 72. The sample phase in the system 60 is controlled through the feedback path to ideally keep the phase error at or near zero. As shown, the interpolator phase controller 84 is driven, through the loop filter 82, based on the phase error signals from the I and Q channels.

FIG. 8 represents one possible embodiment of the invention. Other embodiments may include fewer, further, or different components, interconnected in a similar or different way.

For example, the combiner 80 might not be provided in all embodiments. Either the I channel phase detector 68 or the Q channel phase detector 78 alone would be sufficient to detect symbol timing phase error. Adding them together using the combiner 80 doubles the phase error information that is provided to the loop filter 82, thereby increasing response speed. However, if hardware resources are scarce for instance, one of the phase detectors 68, 78 could be eliminated.

An alternative to using the digital sample interpolators 63, 73 would be to run the whole system 60, from the ADCs 62, 72 onward, using a Voltage Controlled Oscillator (VCO). In this case, the loop filter 82 could be used to drive a DAC which tunes the VCO until the samples from the ADCs 62, 72 are synchronized with the received QAM symbols.

One advantage of using the digital interpolators 63, 73, as shown in FIG. 8, rather than tuning an external oscillator is that a receiver can synchronize with symbol rates independent of the ADC clock rate. For example, with the ADCs 62, 72 running on a fixed 100 MHz clock and $f_s$=32 MHz, so that $2f_s$=64 MHz, the interpolators 63, 73 can produce a sequence of samples corresponding to a sample taken every 1.5625 (100/64) ADC samples. In this case, it is after the interpolators 63, 73 that the received I and Q signals include 2 samples per symbol as shown in FIG. 3.

Figure 9A:
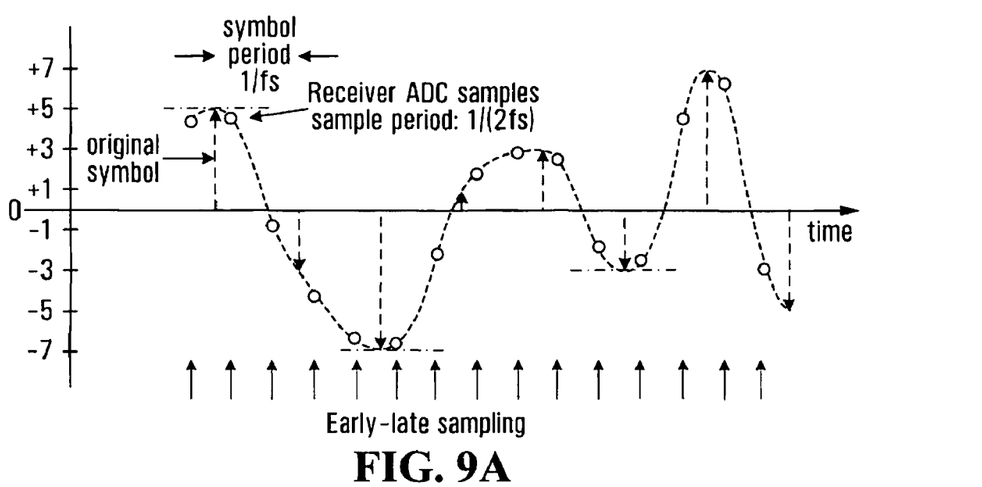
FIG. 9A shows an example plot of a received waveform and FIG. 9B shows a plot of a derivative of the received waveform.
Figure 9B:
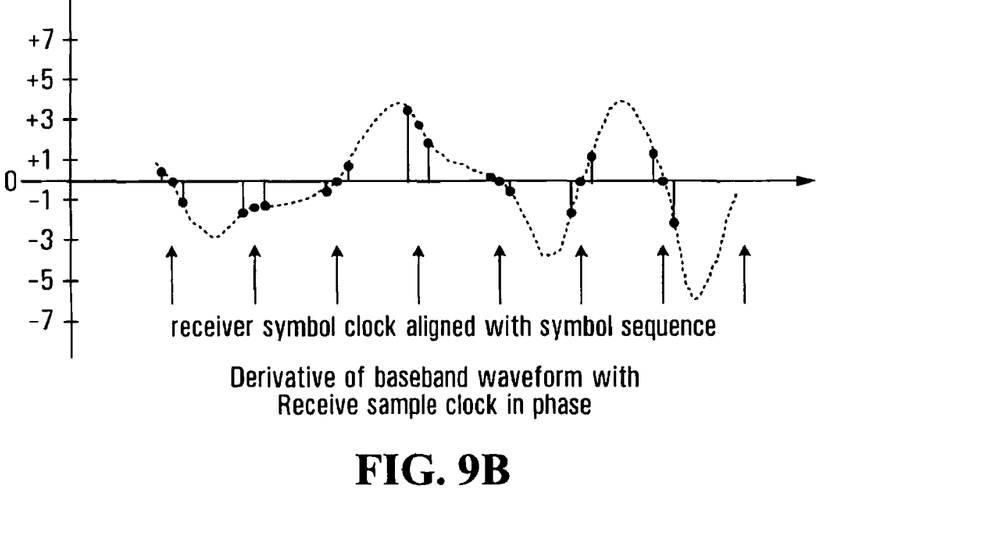

With reference again to FIG. 3, depicting the received baseband waveform from the I or Q channel sampled at two times the symbol rate ($2f_s$), it can be observed that the peaks and valleys where the slope is zero nearly coincide with some of the desired sample points. This is also illustrated in FIGS. 9A and 9B, which show example plots of a received waveform and a derivative of the received waveform.

Put another way, the receiver sample clock should ideally line up with the zero crossings of the derivative of the received waveform. The slope of the waveform around the receive sample point can be measured using additional samples before and after the sample point (early and late samples). Getting these samples typically involves either a much higher ADC sample rate than $2f_s$ or an interpolation computation.

When the receive sample clock is aligned with the symbol sequence, the early-late sample values of the derivative curve should be balanced, on average. Some additional operations may also be used to invert the contribution from negative zero crossings relative to positive zero crossings in order to make a proper phase error detector.

This approach to symbol timing recovery is generally better suited to low order QAM signals like Quadrature Phase Shift Keying (QPSK), rather than 64 or 256 QAM. The higher order schemes, with a larger symbol set, tend to have fewer areas in the waveform that form a peak or valley, and therefore fewer zero crossings in the derivative waveform. The contribution of early-late samples from non zero crossing areas would make a noisy phase detector, which would be best implemented in conjunction with a narrow timing recovery loop response. However, symbol timing recovery loops are usually not dependent on wide tracking loop bandwidths since symbol clocks are typically generated by stable crystal oscillators. This approach may thus be feasible in some implementations.

Other existing timing recovery algorithms that in some way exploit the symmetry (on average) of transitions between symbols, however, might not be suitable for high order QAM signals for similar reasons.

The information obtained from band-edge filtering in accordance with embodiments of the invention is dependent on the cyclostationary random process in the source symbol sequence generator that results in the periodic frequency response shown in FIG. 2. Simulations of the timing recovery system have shown that embodiments of the present invention are not sensitive to the type of QAM signal.

The symbol timing recovery techniques disclosed herein may, but need not necessarily, distinguish between the upper and lower band edge energy in a QAM signal. However, where upper and lower band edges are separated, it is possible to use, for example, the measured power of the upper and lower band-edge signals to control QAM carrier frequency offset correction algorithms or a slope equalizer for correcting a slope in a received signal level across the QAM channel. This represents another potential advantage of some embodiments of the invention.

Figure 10:
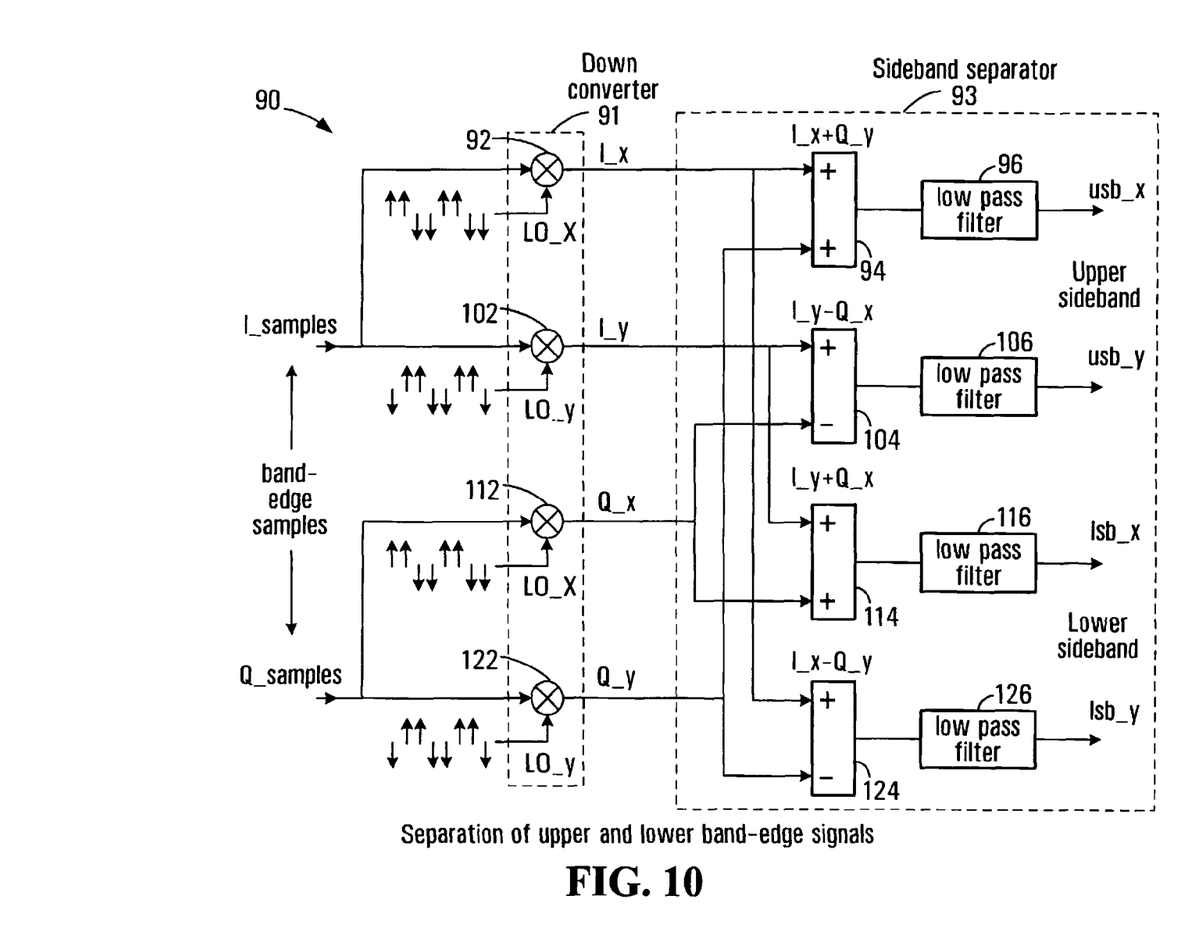
FIG. 10 is a block diagram of a band-edge down converter and signal separator.

A modified system may be used to detect upper and lower band edge signals in another embodiment. FIG. 10 is a block diagram of a band-edge down converter and signal separator system. The system 90 includes a down converter 91 in the form of mixers 92, 102, 112, 122 that multiply band-edge samples by complex LO signals to thereby convert the band-edge filtered signals to baseband. These complex LO signals, as noted above, may or may not be independently generated. The resultant baseband signals are input to a sideband separator 93, which includes combiners 94, 104, 114, 124 that are operatively coupled to low pass filters 96, 106, 116, 126.

As noted above, the receive sample clock is two samples per symbol ($2f_s$). The complex LO waveforms that are used to convert the band-edge signal to baseband are one quarter this rate ($f_s/2$) and consist of a four cycle pattern in one embodiment (FIG. 5 and FIG. 6). These waveforms are changed to the patterns +1 +1 −1 −1 for LO_x, and −1 +1 +1 −1 for LO_y in the system 90.

Looking at the down conversion on the I and Q channels, the x and y outputs of both channels are combined as shown and filtered to remove mixing products around $f_s$. The resulting four signals represent two complex signals: the upper band-edge usb_x, usb_y and the lower band-edge lsb_x, lsb_y. A power measurement of each signal can be calculated by squaring the x and y components, and summing. The difference between the two power measurements, which are upper band-edge power and lower band-edge power, is indicative of a carrier frequency offset and can be used to drive a slope equalizer control loop and/or in carrier synchronization. The slope equalizer control loop adjusts for slope across a receive channel, which keeps the long term average of each measurement equal.

Figure 11:
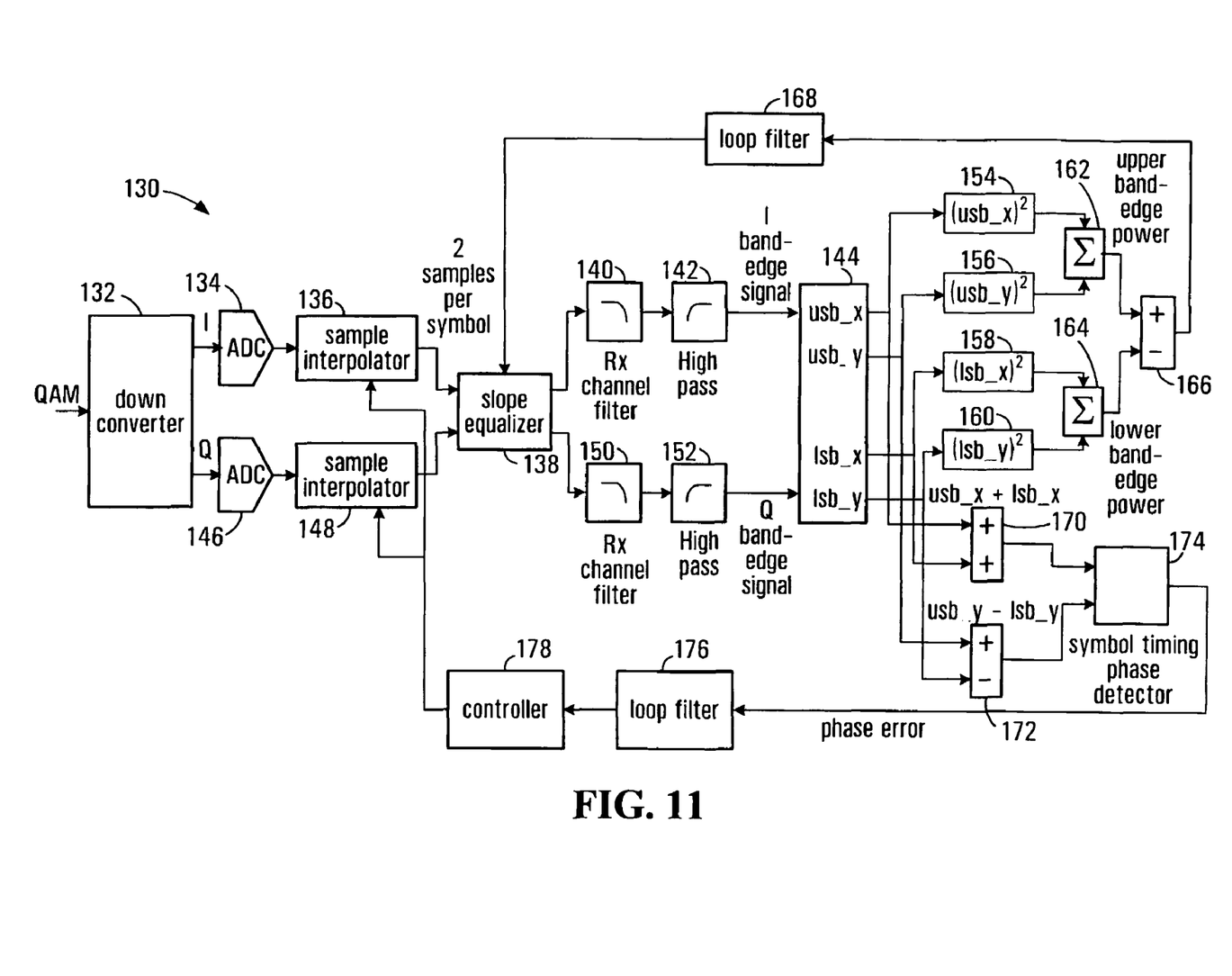
FIG. 11 is a block diagram of a timing and slope equalizer system.

A block diagram of a timing and slope equalizer system is shown in FIG. 11. The system 130 includes a down converter 132, channel ADCs 134, 146 operatively coupled to the down converter, sample interpolators 136, 148 operatively coupled to the ADCs, and a slope equalizer 138 operatively coupled to the sample interpolators. Receive channel filters 140, 150 are operatively coupled to the slope equalizer 138, high pass filters 142, 152 are operatively coupled to the receive channel filters, and a band-edge signal separator 144 is operatively coupled to the high pass filters. The band-edge signal separator 144 provides upper and lower band-edge signals to power calculators, in the form of squarers 154, 156, 158, 160 and combiners 162, 164. The outputs of the combiners 162, 164 are input to the combiner 166. The combiner 166 is operatively coupled to a feedback path, which includes a loop filter 168 and provides a feedback signal to the slope equalizer 138. The combiners 170, 172 combine the upper and lower band-edge signals to generate input signals for the symbol timing phase detector 174. A symbol timing phase or phase error feedback path is operatively coupled between the symbol timing phase detector 174 and the sample interpolators 136, 148, and includes a loop filter 176 and a controller 178.

In the system 130, the slope equalizer 138 is a complex coefficient filter, and thus performs a complex filtering operation on the I and Q channels. Slope equalization in the system 130 is based on a difference between the upper band-edge power and the lower band-edge power, as determined at 162, 164, 166. Although shown in FIG. 11 as being operatively coupled between the sample interpolators 136, 148 and the receive channel filters 140, 150, the slope equalizer 138 can be placed anywhere in the I and Q signal path before symbol detection, to correct for a slope in received signal levels across a channel due to distortion, for example. FIG. 11 relates primarily to symbol timing recovery, and accordingly symbol detection using recovered symbol timing has not been explicitly shown in the drawing.

It should be noted that upper and lower band-edge signal separation may also be useful for other purposes than slope correction as shown in FIG. 11, such as in carrier synchronization. The system 130 may thus provide band-edge signals, band-edge signal power measurements, or both, to a carrier recovery or synchronization system (not shown), which may be integrated with symbol timing recovery or implemented separately.

Figure 6B:
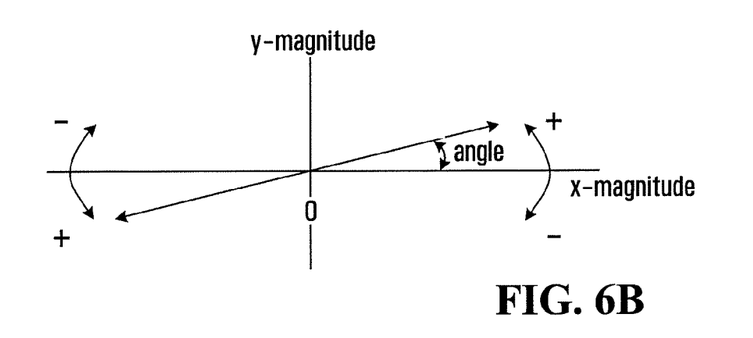

The symbol timing phase error is measured by combining the four signals representing upper and lower band-edge signals at 170, 172 with two addition operations. The two resulting signals represent the varying magnitude vector as shown in FIG. 6B. This vector is generated with contributions from both the I and Q channels, so just a single phase detector 174 can be used to drive the symbol timing recovery loop filter 176. It will be apparent that the symbol timing phase detector 174 receives baseband signals at its inputs, and accordingly need not itself include a down converter.

What has been described is merely illustrative of the application of principles of embodiments of the invention. Other arrangements and methods can be implemented by those skilled in the art without departing from the scope of the present invention.

For example, embodiments of the invention may be implemented using further, fewer, or different components, with similar or different interconnections, than explicitly shown. An apparatus or system in which or in conjunction with which embodiments of the invention is implemented may include receiver components in addition to those shown in the drawings and described above. Those skilled in the art will appreciate that a receiver will include at least components for processing received signals.

In addition, although described above primarily in the context of systems, other implementations of the invention are also contemplated, as methods, for example.

Figure 12:
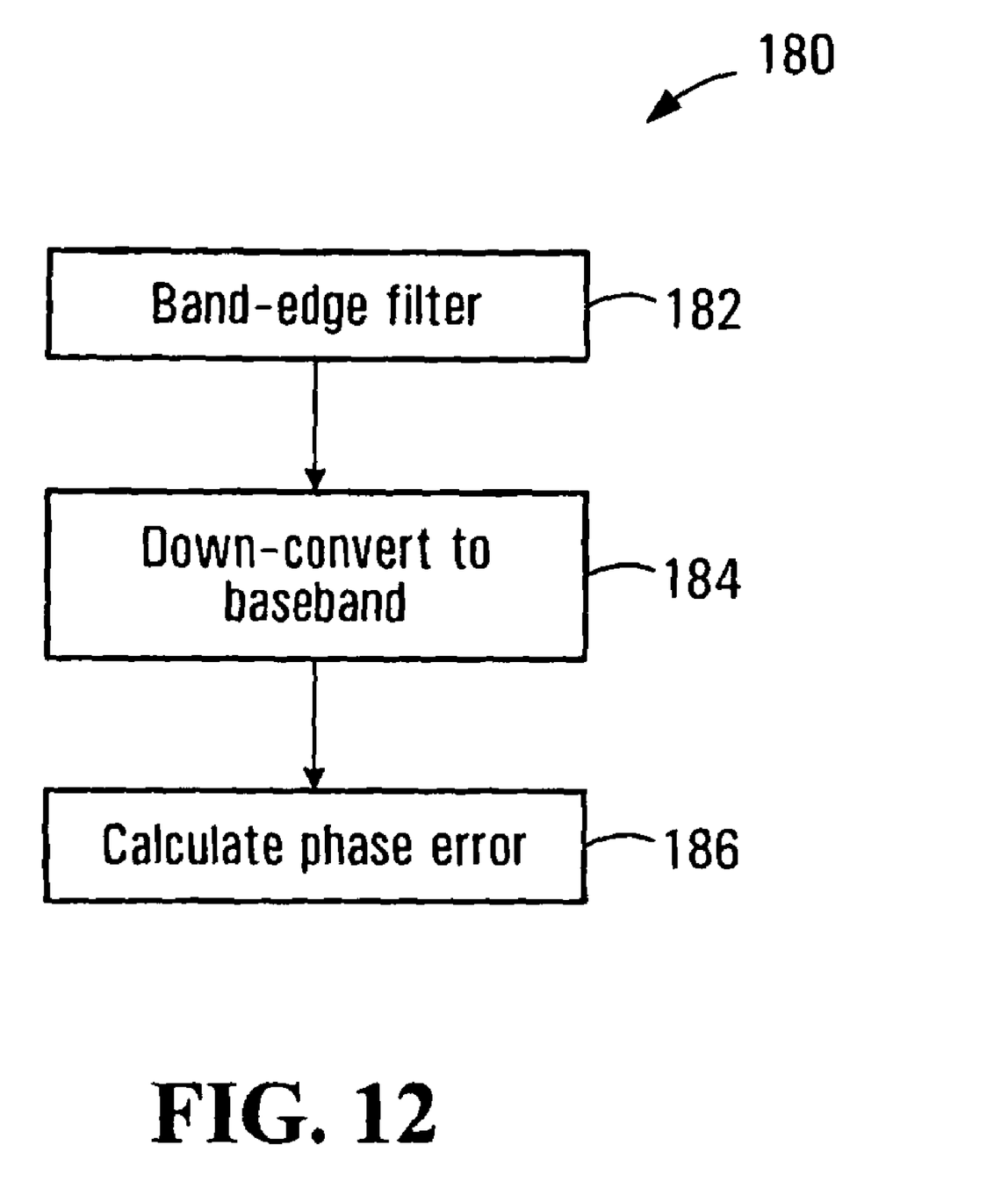
FIG. 12 is a flow diagram of an example method according to an embodiment of the invention.

One such method 80 is shown in FIG. 12, and includes operations of band-edge filtering samples of a received communication signal at 182 to provide a filtered output signal comprising band edges of the samples, the received communication signal comprising symbols and the samples comprising samples of the communication signal according to receive symbol timing, down converting the filtered output signal to baseband at 184, and calculating a phase error of the receive symbol timing at 186, based on the down converted baseband signal.

The method 180 represents one embodiment of the invention, and is intended for illustrative purposes only. Other embodiments may include further, fewer, or additional operations which are performed in a similar or different order. For example, another method might include similar operations for a received communication signal contains symbols associated with quadrature channels. In this case, the filtered output signal includes band edges of samples associated with each quadrature channel. Such a method might also include, for example, separating the down converted baseband signals into upper and lower band-edge signals, and calculating a phase error of the receive symbol timing based on the upper and lower band-edge signals.

Methods according to embodiments of the invention may be implemented by apparatus or systems, or in other forms such as instructions stored on a computer-readable medium.

I claim:

1. An apparatus comprising:
a band-edge filtering arrangement operable to receive as inputs samples of a received communication signal, and to provide a filtered output signal comprising band edges of the samples, the received communication signal comprising symbols and the samples comprising samples of the communication signal according to receive symbol timing;
a down converter operatively coupled to the band-edge filtering arrangement and operable to convert the filtered output signal to baseband by multiplying the filtered output signal by quadrature carrier waveforms; and
a symbol timing phase error calculator operatively coupled to the down converter and operable to calculate a phase error of the receive symbol timing based on the down converted baseband signal, the symbol timing phase error calculator determining a sign of a product of the filtered output signal and one of the quadrature carrier waveforms, and comprising a multiplier for multiplying the product of the filtered output signal and another of the quadrature carrier waveforms by the determined sign.

2. The apparatus of claim 1, wherein the quadrature carrier waveforms comprise four-cycle quadrature patterns.

3. The apparatus of claim 1, wherein the band-edge filtering arrangement comprises a low pass communication channel filter and a high pass filter operatively coupled to the low pass channel filter.

4. The apparatus of claim 1, further comprising:
a sample interpolator operatively coupled to the band-edge filtering arrangement and operable to provide the samples to the band-edge filtering arrangement; and
a feedback path operatively coupled between the symbol timing phase error calculator and the sample interpolator, the feedback path comprising a controller for adjusting the receive symbol timing based on the calculated symbol timing phase error.

5. The apparatus of claim 1, further comprising:
an Analog to Digital Converter (ADC) operatively coupled to the band-edge filtering arrangement and operable to provide the samples to the band-edge filtering arrangement;
a Voltage Controlled Oscillator (VCO) operatively coupled to the ADC and operable to generate the receive symbol timing; and
a feedback path operatively coupled between the symbol timing phase error calculator and the VCO, the feedback path comprising a controller for controlling the VCO to adjust the receive symbol timing based on the calculated symbol timing phase error.

6. The apparatus of claim 1, the symbols comprising symbols associated with quadrature channels, the samples comprising samples of the communication signal according to receive symbol timing, the filtered output signal comprising a respective filtered output signal comprising band edges of samples associated with each quadrature channel, the down converter being operable to convert the respective filtered output signals to baseband,
the apparatus further comprising:
a band-edge signal separator operatively coupled to the down converter and operable to separate the down converted baseband signals into upper and lower band-edge signals,
the symbol timing phase error calculator being operatively coupled to the band-edge signal separator and operable to calculate the phase error of the receive symbol timing based on the upper and lower band-edge signals.

7. The apparatus of claim 6, wherein the down converter is operable to down convert the filtered output signals to baseband by multiplying each of the filtered output signals by quadrature carrier waveforms.

8. The apparatus of claim 6, wherein the band-edge signal separator comprises combiners operatively coupled to the down converter and operable to combine the down converted baseband signals into the upper and lower band-edge signals, and filters operatively coupled to the combiners and operable to filter non-baseband components out of the upper and lower band-edge signals.

9. The apparatus of claim 6, further comprising:
power calculators for calculating powers of the upper and lower band-edge signals; and
a combiner for calculating a difference between the powers of the upper and lower band-edge signals.

10. The apparatus of claim 6, further comprising:
a slope equalizer operatively coupled to the band-edge filtering arrangement; and
a feedback path operatively coupled between the band-edge signal separator and the slope equalizer, the feedback path comprising a controller for controlling the slope equalizer based on the upper and lower band-edge signals.

11. The apparatus of claim 10, further comprising:
a phase error feedback path operatively coupled to the symbol timing phase error calculator, the phase error feedback path comprising a controller for adjusting a phase of the receive symbol timing based on the calculated symbol timing phase error.

12. A method comprising:
band-edge filtering samples of a received communication signal to provide a filtered output signal comprising band edges of the samples, the received communication signal comprising symbols and the samples comprising samples of the communication signal according to receive symbol timing;
down converting the filtered output signal to baseband by multiplying the filtered output signal by quadrature carrier waveforms; and
calculating a phase error of the receive symbol timing based on the down converted baseband signal by determining a sign of a product of the filtered output signal and one of the quadrature carrier waveforms, and multiplying the product of the filtered output signal and another of the quadrature carrier waveforms by the determined sign.

13. The method of claim 12, wherein the quadrature carrier waveforms comprise four-cycle quadrature patterns.

14. The method of claim 12, further comprising:
interpolating samples of the received communication signal to provide the samples for band-edge filtering.

15. The method of claim 12, the symbols comprising symbols associated with quadrature channels, the samples comprising samples of the communication signal according to receive symbol timing, the filtered output signal comprising a respective filtered output signal comprising band edges of samples associated with each quadrature channel, the down converting comprising down converting the respective filtered output signals to baseband,
the method further comprising:
separating the down converted baseband signals into upper and lower band-edge signals,
the calculating comprising calculating the phase error of the receive symbol timing based on the upper and lower band-edge signals.

16. The method of claim 15, wherein down converting comprises multiplying each of the filtered output signals by quadrature carrier waveforms.

17. The method of claim 15, wherein separating comprises combining the down converted baseband signals into the upper and lower band-edge signals, and filtering non-baseband components out of the upper and lower band-edge signals.

18. The method of claim 15, further comprising:
calculating power of the upper and lower band-edge signals; and
calculating a difference between the powers of the upper and lower band-edge signals.

19. The method of claim 15, further comprising:
adjusting a phase of the receive symbol timing based on the calculated symbol timing phase error.

20. A non-transitory computer-readable medium storing instructions which when executed perform the method comprising:
band-edge filtering samples of a received communication signal to provide a filtered output signal comprising band edges of the samples, the received communication signal comprising symbols and the samples comprising samples of the communication signal according to receive symbol timing;
down converting the filtered output signal to baseband by multiplying the filtered output signal by quadrature carrier waveforms; and
calculating a phase error of the receive symbol timing based on the down converted baseband signal by determining a sign of a product of the filtered output signal and one of the quadrature carrier waveforms, and multiplying the product of the filtered output signal and another of the quadrature carrier waveforms by the determined sign.

* * * * *